United States Patent [19]

Straub et al.

[11] 4,330,451

[45] May 18, 1982

[54] PREPARATION OF A POLYVINYLPYRROLIDONE BY HEAT TREATMENT OF AN AQUEOUS SOLUTION OF A CONVENTIONAL POLYVINYLPYRROLIDONE

[75] Inventors: Ferdinand Straub, Hockenheim; Heinrich Hartmann, Limburgerhof; Paul Naegele, Neuhofen; Karl Seib, Weinheim, all of Fed. Rep. of Germany

[73] Assignee: BASF Aktiengesellschaft, Ludwigshafen, Fed. Rep. of Germany

[21] Appl. No.: 197,022

[22] Filed: Oct. 16, 1980

[30] Foreign Application Priority Data

Oct. 22, 1979 [DE] Fed. Rep. of Germany ....... 2942657

[51] Int. Cl.$^3$ ............................................. C08L 39/06
[52] U.S. Cl. ................................... 524/458; 524/808
[58] Field of Search ............... 260/326.25, 29.6 HN, 260/29.6 AT, 29.6 WB; 526/264; 525/336, 386, 387

[56] References Cited

U.S. PATENT DOCUMENTS

| | | | |
|---|---|---|---|
| 2,658,045 | 11/1953 | Schildknecht | 260/29.6 HN |
| 2,734,894 | 2/1956 | Vaughan | 525/386 |
| 3,350,366 | 10/1967 | Merijan | 525/336 |
| 3,437,647 | 4/1969 | Freifeld | 525/336 |
| 4,006,283 | 2/1977 | MacKenzie, Jr. et al. | 525/387 |

FOREIGN PATENT DOCUMENTS 1506965 4/1978 United Kingdom ............... 526/264

*Primary Examiner*—Henry R. Jiles
*Assistant Examiner*—Jane T. Fan
*Attorney, Agent, or Firm*—Oblon, Fisher, Spivak, McClelland & Maier

[57] ABSTRACT

A process for the preparation of high-viscosity polyvinylpyrrolidone, wherein an aqueous polyvinylpyrrolidone solution is subjected to a heat treatment in the presence of a water-insoluble peroxide and in the absence of oxygen, and thickeners containing the polyvinylpyrrolidone thus prepared.

3 Claims, No Drawings

PREPARATION OF A POLYVINYLPYRROLIDONE BY HEAT TREATMENT OF AN AQUEOUS SOLUTION OF A CONVENTIONAL POLYVINYLPYRROLIDONE

The present invention relates to a process for the preparation of polyvinylpyrrolidone, hereafter also referred to as PVP, which gives extremely viscous aqueous solutions.

The invention further relates to thickeners containing such polyvinylpyrrolidones.

It is known that vinylpyrrolidone can be polymerized, in aqueous solution or in suspension in an organic non-solvent for vinylpyrrolidone, in the presence of a free radical initiator.

Solution polymerization processes give commercially useful products with K values of from 10 to 90, ie. the viscosities of dilute aqueous solutions of such products are still very low, for example less than 2 mPa.s in 2% strength aqueous solution.

For thickeners, as required, for example, in cosmetic formulations or printing inks, the viscosities of dilute solutions must be substantially higher; in conventional thickeners such as polyacrylic acids they are 100 mPa.s, or even substantially higher still, in 1–3% strength solution.

On the other hand, it is an object of the present invention to permit the use of polyvinylpyrrolidones, which are also water-soluble products, for the above purposes, since it is known that the viscosity characteristics of aqueous polyvinylpyrrolidone solutions are independent of the pH.

By contrast, in the case of polyelectrolytes such as polyacrylic acid, which have hitherto been employed as, for example, thickeners, it is necessary to observe a very narrow pH range.

German Laid-Open Application DOS No. 2,602,917 discloses a process for the preparation of PVP by a specific method of suspension polymerization of vinylpyrrolidone. Using this process, polymers having molecular weights of 200,000, corresponding to K values of up to 200, are obtained.

However, viscosity measurements which we have carried out, cf. the Examples, have shown that these products still have far too low a viscosity to constitute serious competition, for example as thickeners, to polyelectrolytes such as polyacrylates.

It is an object of the present invention to provide a polyvinylpyrrolidone which has higher viscosities in aqueous solution.

We have found that this object is achieved if a PVP prepared by conventional methods is converted, in aqueous solution, to a PVP which gives extremely viscous dilute aqueous solutions, the conversion being effected by heating the aqueous starting solution in the presence of a water-insoluble organic peroxide and in the absence of air. Specifically, in the novel process for the preparation of polyvinylpyrrolidone which has high viscosities in aqueous solution, a 5–30% strength by weight aqueous solution of a polyvinylpyrrolidone obtained by free radical polymerization in a conventional manner, is heated at from 20° to 250° C. in the presence of from 0.5 to 5% by weight, based on polyvinylpyrrolidone, of a water-insoluble organic peroxide, and in the absence of oxygen.

This method gives, for example, a 2% strength by weight PVP solution which has a viscosity of >2,000 mPa.s at room temperature.

On dehydrating the resulting aqueous PVP solutions, a solid PVP is obtained, which on redissolving in water also shows the above properties.

Further, we have found that these viscosities can be increased yet further if the heat after-treatment is carried out in the presence of up to 75% by weight, based on PVP starting material, of monomeric vinylpyrrolidone. In that case, viscosities, of a 2% strength aqueous solution at 20° C., in excess of 2,000 mPa.s are achieved.

The starting material for the novel process is a polyvinylpyrrolidone which has been obtained by a conventional process of polymerization of vinylpolypyrrolidone in the presence of a free radical initiator. Advantageously, the polyvinylpyrrolidone starting material has a K value of from 30 to 90, preferably from 60 to 90, since such materials give particularly high-viscosity products on treatment in accordance with the invention.

The other starting material used is a water-insoluble organic peroxide. This may be chosen from, for example, water-insoluble per-esters, dialkyl peroxides and diaryl peroxides, which are effective catalysts for the reaction. Examples of compounds which we have found to be particularly effective are di-tert.-butyl peroxide, tert.-butyl perpivalate, tert.-butyl perethylhexanoate, di-tert.-amyl peroxide, dicumyl peroxide and 2,5-dimethyl-2,5-di-(tert.-butylperoxy)-hexane.

These peroxides are used in amounts of from 0.5 to 5, preferably from 1 to 3%, by weight, based on polyvinylpyrrolidone. The process is carried out by preparing an aqueous PVP solution of from 5 to 30% strength by weight, preferably from 10 to 20% strength by weight, adding the stated amount of peroxide and heating the mixture at 20°–250° C. whilst mechanically agitating the batch to disperse the insoluble peroxide. The choice of temperature depends on the decomposition temperature of the particular peroxide and is preferably from 50° to 250° C.

The duration of the after-treatment is from a few minutes to several hours, depending on the reaction temperature, preferably from 15 minutes to 2 hours.

If the process is to succeed, the reaction must be carried out in the absence of air, ie. oxygen must be absent.

In principle it is also possible to carry out the process under conditions somewhat outside the stated ranges of, for example, concentration of the solution and concentration of the peroxide, but this offers no advantages.

The reaction product formed can be directly discharged from the reaction vessel and diluted to the use concentration; it can however also be dried, for example on drum dryers, and then be redissolved.

An aqueous solution of such an after-treated PVP has viscosities which were not attainable with conventional polyvinylpyrrolidones, even of the highest molecular weight. The viscosity of a 2% strength by weight aqueous solution, measured at 20° C., is in general in excess of 1,000 mPa.s, and in most cases from 1,500 to 2,000 mPa.s.

Even higher viscosities, ie. higher than 2,000, and in most cases from 3,000 to 6,000, mPa.s, measured under the same conditions as above, are achieved if, according to a special embodiment of the invention, the after-treatment is carried out in the presence of up to 75% by weight, preferably of from 10 to 50% by weight, based on PVP, of monomeric vinylpyrrolidone. In this embodiment the procedure followed is as described above, but it is advantageous to add the monomeric vinylpyrrolidone progressively during the reaction. Of course all of the monomeric vinylpyrrolidone can also be added immediately, ie. at the start of the reaction, but this causes an excessive rise in viscosity at the very start of the reaction, which can under certain circumstances make mechanical agitation of the batch difficult.

The polyvinylpyrrolidones prepared as described may be used as electrolyte-stable thickeners, as cosmetic auxiliaries, as adhesives, as protective colloids, as dispersants for dyes and pigments, and for tertiary petroleum production. A great advantage, in addition to the stability to added salts, is the well-known good physiological acceptability of polyvinylpyrrolidones.

The Examples which follow illustrate the invention. Parts are by weight.

EXAMPLE 1

400 parts of polyvinylpyrrolidone of K value 90 are dissolved in 2,600 parts of water. 8 parts of 2,5-dimethyl-2,5-di-(tert.-butylperoxy)-hexane are then added. The mixture is flushed with nitrogen and stirred for 1½ hours in an autoclave at 140° C. When it has cooled, the gel is removed and diluted with water. The resulting solution has a viscosity, measured at 2% strength and 20° C., of 1,500 mPa.s, the measurement being carried out after 3 days on a Brookfield RVT viscometer, with spindle 3 rotating at 20 rpm.

EXAMPLE 2

400 parts of PVP, of K value 90, are dissolved in 2,600 parts of water. 8 parts of di-tert.-butyl peroxide and 40 parts of vinylpyrrolidone are added; the mixture is flushed with nitrogen and stirred for 4½ hours in an autoclave at 133° C. When it has cooled, the mixture is diluted with water; a 2% strength aqueous solution of the product has a viscosity, at 20° C., of 3,250 mPa.s, measured on the same instrument as in Example 1.

EXAMPLE 3

400 parts of PVP, of K value 90, are dissolved in 2,600 parts of water. 8 parts of 2,5-dimethyl-2,5-di-(tert.-butylperoxy)-hexane and 120 parts of vinylpyrrolidone are added. The mixture is flushed with nitrogen and stirred for 1½ hours in an autoclave at 140° C. After dilution to 2% solids content, the aqueous solution has a viscosity of 3,650 mPa.s at 20° C.

EXAMPLE 4

400 parts of PVP, of K value 90, are dissolved in 2,600 parts of water. 8 parts of di-tert.-butyl peroxide and 200 parts of vinylpyrrolidone are added. The mixture is flushed with nitrogen and stirred for 1 hour in an autoclave at 140° C. After cooling, and diluting to 2% strength in water, the product has a viscosity of 2,050 mPa.s at 20° C.

EXAMPLE 5

400 parts of PVP, of K value 90, are dissolved in 2,600 parts of water. 4 parts of 2,5-dimethyl-2,5-di-(tert.-butylperoxy)-hexane are added. The mixture is flushed with $N_2$ and heated to 140° C. in a stirred autoclave. 200 parts of vinylpyrrolidone are introduced into the mixture at a uniform rate over 1 hour, and after a further hour the batch is cooled. After dilution to 2% strength, the aqueous solution has a viscosity, at 20° C., which is too high to be determined exactly but is greater than 5,000 mPa.s.

EXAMPLE 6

The 2% strength solution from Example 4 is mixed with the following amounts of sodium chloride (the percentages being based on PVP content), and the viscosity is then measured.

1% of NaCl—2,050 mPa.s
2% of NaCl—2,100 mPa.s
3% of NaCl—2,250 mPa.s
4% of NaCl—2,150 mPa.s
5% of NaCl—2,200 mPa.s
8% of NaCl—1,900 mPa.s
11% of NaCl—1,900 mPa.s

COMPARATIVE EXAMPLES

1. A 2% strength aqueous solution of polyvinylpyrrolidone of K value 90 has a viscosity of 1 mPa.s, ie. virtually the same as that of water.

2. A 2% strength aqueous solution of a suspension polymer which has been obtained according to German Laid-Open Application DOS No. 2,602,917 and has a K value of 200, has a viscosity of 23 mPa.s.

3. An 0.1% strength polyacrylic acid in fully demineralized water has a viscosity of 8,000 mPa.s; an 0.1% strength solution in tapwater containing the usual amounts of electrolyte has a viscosity of only 4 mPa.s.

We claim:

1. A process for the preparation of polyvinylpyrrolidone which has a high viscosity in aqueous solution, wherein a 5–30% strength by weight aqueous solution of a polyvinylpyrrolidone, prepared by free radical polymerization in a conventional manner, is heated at from 20° to 250° C. in the absence of oxygen and in the presence of from 0.5 to 5% by weight, based on polyvinylpyrrolidone, of a water-insoluble organic peroxide, to yield said highly viscous polyvinylpyrrolidone in aqueous solution.

2. A process as claimed in claim 1, wherein the heating is carried out in the presence of up to 75% by weight, based on polyvinylpyrrolidone, of monomeric vinylpyrrolidone.

3. The process of claim 2 wherein the up to 75% by weight of monomeric vinylpyrrolidone is added progressively during the reaction to yield 3,000 to 6,000 mPa.s.

* * * * *